United States Patent
Grehl et al.

(10) Patent No.: US 10,358,101 B2
(45) Date of Patent: Jul. 23, 2019

(54) DEFORMATION ELEMENT FOR A MOTOR VEHICLE, AND MOTOR VEHICLE HAVING SUCH A DEFORMATION ELEMENT

(71) Applicant: Bayerische Motoren Werke Aktiengesellschaft, Munich (DE)

(72) Inventors: Marco Grehl, Schoenberg (DE); Oeztzan Akif, Munich (DE); Gerhard Fichtinger, Grasbrunn (DE); Wilhelm Riedl, Pfaffenhofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/852,370

(22) Filed: Dec. 22, 2017

(65) Prior Publication Data
US 2018/0118140 A1    May 3, 2018

Related U.S. Application Data

(63) Continuation of application No. PCT/EP2016/064192, filed on Jun. 20, 2016.

(30) Foreign Application Priority Data

Jun. 26, 2015   (DE) .................. 10 2015 211 977

(51) Int. Cl.
*B60R 19/34*    (2006.01)
*F16F 7/12*    (2006.01)

(52) U.S. Cl.
CPC ............. *B60R 19/34* (2013.01); *F16F 7/125* (2013.01)

(58) Field of Classification Search
CPC ... B60R 19/34; B60R 19/18; B60R 2019/247; B60R 19/023; B60R 19/03; B60R 19/24;
(Continued)

(56) References Cited

U.S. PATENT DOCUMENTS 3,097,725 A * 7/1963 Peterson ................. B60R 19/36
188/268
3,899,047 A    8/1975 Maeda et al.
(Continued)

FOREIGN PATENT DOCUMENTS

CH    547 967 A    4/1974
DE    2 403 613 A    8/1974
(Continued)

OTHER PUBLICATIONS

International Search Report (PCT/ISA/210) issued in PCT Application No. PCT/EP2016/064192 dated Aug. 31, 2016 with English translation (five pages0.

(Continued)

*Primary Examiner* — D Glenn Dayoan
*Assistant Examiner* — Sunsurraye Westbrook
(74) *Attorney, Agent, or Firm* — Crowell & Moring LLP (57) ABSTRACT

To improve the safety of passengers of a motor vehicle and road users in the case of a fronted collision, a deformation element is provided and has a cross-beam holder for mounting to a cross-beam and a bumper plate that can be positioned next to a bumper of a motor vehicle. The deformation element is characterized in that a friction device for adjusting and fixing the distance of the cross-beam holder from the bumper plate is provided between the bumper plate and the cross-beam holder, a first distance of the bumper plate from the cross-beam holder, starting from a normal position, being greater in a first position than a distance in a second position.

12 Claims, 5 Drawing Sheets

(58) Field of Classification Search
CPC ...... B60R 2019/1813; B60R 2019/262; B60R 19/04; B60R 2019/182; B60R 19/30; F16F 7/12; F16F 7/125; F16F 7/121; F16F 7/123
USPC ....... 293/132, 133, 102, 120, 142, 115, 121, 293/146, 153, 4; 296/187.09, 82, 187.03, 296/203.02, 187.11, 190.01
See application file for complete search history.

(56) References Cited

U.S. PATENT DOCUMENTS

| | | | | |
|---|---|---|---|---|
| 5,181,589 | A * | 1/1993 | Siegner | B60R 19/36 188/268 |
| 7,192,067 | B2 * | 3/2007 | Hansen | B60R 19/34 293/132 |
| 7,484,781 | B1 * | 2/2009 | Garber | B60R 19/34 293/132 |
| 9,592,780 | B2 * | 3/2017 | Wendel | B60R 19/26 |
| 2011/0042975 | A1 * | 2/2011 | Faruque | B60R 19/28 293/118 |
| 2012/0286529 | A1 | 11/2012 | Gukkenberger et al. | |
| 2013/0307288 | A1 * | 11/2013 | Wavde | B60R 19/34 296/187.05 |

FOREIGN PATENT DOCUMENTS

| | | |
|---|---|---|
| DE | 10 2011 009 943 A1 | 8/2011 |
| EP | 1 959 153 A1 | 8/2008 |
| FR | 2 181 044 A1 | 11/1973 |

OTHER PUBLICATIONS

German-language Written Opinion (PCT/ISA/237) issued in PCT Application No. PCT/EP2016/064192 dated Aug. 31, 2016 (five pages).

German-language Search Report issued in counterpart German Application No. 10 2015 211 977.7 dated May 3, 2016 with partial English translation (13 pages).

* cited by examiner

DEFORMATION ELEMENT FOR A MOTOR VEHICLE, AND MOTOR VEHICLE HAVING SUCH A DEFORMATION ELEMENT

CROSS REFERENCE TO RELATED APPLICATIONS

This application is a continuation of PCT International Application No. PCT/EP2016/064192, filed Jun. 20, 2016, which claims priority under 35 U.S.C. § 119 from German Patent Application No. 10 2015 211 977.7, filed Jun. 26, 2015, the entire disclosures of which are herein expressly incorporated by reference.

BACKGROUND AND SUMMARY OF THE INVENTION

The present invention relates to a deformation element for a motor vehicle having a crossmember holder for mounting on a crossmember and having a bumper plate which can be positioned adjacent to a bumper of a motor vehicle. Moreover, the present invention relates to a motor vehicle equipped with such a deformation element.

For the purpose of protecting a motor vehicle in the event of a frontal accident, for protecting occupants of the motor vehicle involved in such an accident and also for protecting persons, in particular pedestrians, situated outside the motor vehicle and caught up in such an accident, a series of measures is provided.

In the case of a so-called low-speed crash, in which a comparatively high load of up to about 100 kN acts with a comparatively low speed of from 4 km/h up to about 20 km/h on the front region of a motor vehicle (for example, a crash when the vehicle bangs into an object while parking), a deformation element belonging to the vehicle is provided so that the load is taken up reversibly and in as disturbance-free a manner as possible.

To illustrate a pedestrian protection function in the front region of a motor vehicle, it is provided that a comparatively low load of up to about 5 kN in a comparatively high speed range from about 20 km/h to 40 km/h is taken up by a deformation element provided in the front region of the motor vehicle.

To realize protection in the case of a low-speed crash and for a pedestrian protection function, DE 10 2011 009 943 A1 discloses an energy-absorption system for installation between a bumper and a crossmember of a motor vehicle. In this system, a soft component and a hard component are inter-engaged and extend over the entire width of the motor vehicle. Using the known energy-absorption system can result in a comparatively large overhang (this is the distance from the wheel center point to the foremost point of the front cladding), which is not always desired from an aesthetic point of view and, additionally, negatively influences the ramp angle of the corresponding motor vehicle.

It is an object of the present invention to overcome the disadvantages of the prior art.

This and other objects are achieved by a deformation element having a crossmember holder for mounting on a crossmember and a bumper plate which can be positioned adjacent to a bumper of a motor vehicle. Furthermore, a friction device between the bumper plate and crossmember holder is provided for adjusting and fixing the distance from the crossmember holder to the bumper plate, wherein a first distance from the bumper to the crossmember holder—starting from a normal position i.e., meaning representing an accident-free situation—is greater in a first position different from the normal position than a distance in a second position different from the normal position. Here, the first position is assumed by the deformation element during the occurrence of a low-speed crash. The second position is assumed by the deformation element within the context of the pedestrian protection function. The distance from the bumper plate to the crossmember holder in the normal position is greater than the distance between said elements in the first position and the second position.

An advantageous configuration of the friction device makes possible a particularly precise and reliable function of the deformation element provided according to the invention. For this reason, it is provided that the friction device has a first friction surface between the crossmember holder and bumper plate and also a second friction surface between the crossmember holder and bumper plate such that the first friction surface allows adjustment and fixing of the bumper plate in the first position and blocks it in the second position, whereas the second friction surface allows adjustment and fixing of the bumper plate in the second position and blocks it in the first position.

The precision of the deformation element according to the invention is further improved if the friction device is a friction body, such as a wedge, on whose outer surface is at least partially situated the first friction surface interacting with the crossmember holder and on whose inner surface is at least partially situated the second friction surface interacting with the bumper plate.

For the purpose of easy producibility of the deformation element according to the invention and more precise guidance of the friction device, the bumper plate is situated on a plunger whose outer surface has a third friction surface which interacts with the second friction surface.

Provision can advantageously be made in the case of the deformation element according to the invention for the crossmember holder to be mounted on a sleeve which at least partially has on its inner side a fourth friction surface and which interacts with the first friction surface; the accuracy of the guidance of the friction device is further improved as a result.

For adequate, load case-dependent setting of the deformation element according to the invention, the coefficients of static friction and/or coefficients of sliding friction thereof can be freely selected in the region of each individual friction surface, a plurality of friction surfaces or all friction surfaces.

The aforementioned object is also achieved by a motor vehicle having a crossmember and a bumper, wherein a deformation element of the above-described type according to the invention is provided. The aforementioned advantages apply correspondingly.

According to the invention, a number of deformation elements according to the invention can be provided along the vehicle transverse direction, with the result that a whole series of load cases or protection functions is realized. Here, their position, for example their arrangement parallel to the vehicle vertical axis, can, in principle, be freely configured with respect to a vehicle body and is limited only by the underlying load case.

In a particularly advantageous manner, the deformation elements fastened in such a manner, in particular along the crossmember, have at least in part friction devices with different coefficients of friction. This makes it possible for the deformation elements to be adapted in a position-dependent manner to different load cases in a simple manner.

The above-described features of the present invention can, where possible, be combined with one another, even when not explicitly described above.

Other objects, advantages and novel features of the present invention will become apparent from the following detailed description of one or more preferred embodiments when considered in conjunction with the accompanying drawings.

DETAILED DESCRIPTION OF THE DRAWINGS

A detailed, nonprejudicial, in particular nonlimiting, description of an exemplary embodiment of the present invention is given below with reference to FIGS. 1 to 5. Identical elements are provided with identical reference signs, unless specified otherwise.

Figure 1:
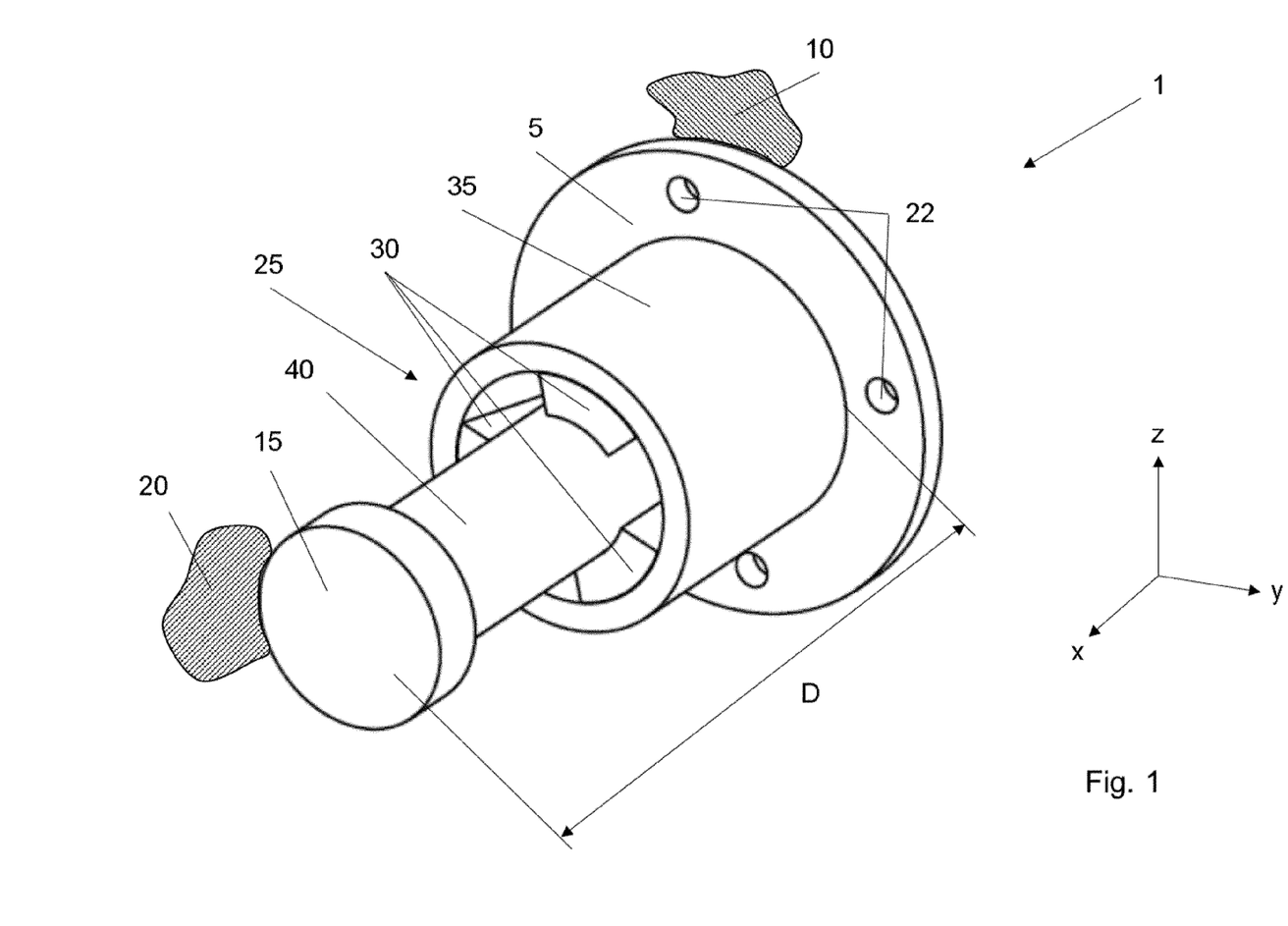
FIG. 1 is an isometric view of an exemplary deformation element according to the invention in a normal position.

FIG. 1 is an isometric view showing a deformation element 1 having a crossmember holder 5 for mounting on a crossmember 10 and having, opposite thereto, a bumper plate 15 which can be positioned adjacent to or connected to a bumper 20. The crossmember holder 5 can be fixed to the crossmember 10 in a manner known per se by use of fastening elements (not shown here), for example screws, which extend through openings 22.

The crossmember holder 5 and the bumper plate 15 are connected to one another by way of a friction device 25 in such a way that the distance D existing between them is reduced in the case of a frontal collision or a frontal crash, starting from the normal position of the deformation element 1 shown in FIG. 1. In the exemplary embodiment shown here, the friction device 25 itself comprises three friction elements 30 which are uniformly received over the circumference of an externally cylindrical housing or of a sleeve 35 of the friction device 25. Within the sleeve 35 and the friction elements 30 there is accommodated a plunger 40 whose end facing away from the crossmember holder 5 has the bumper plate 15.

Figure 2:
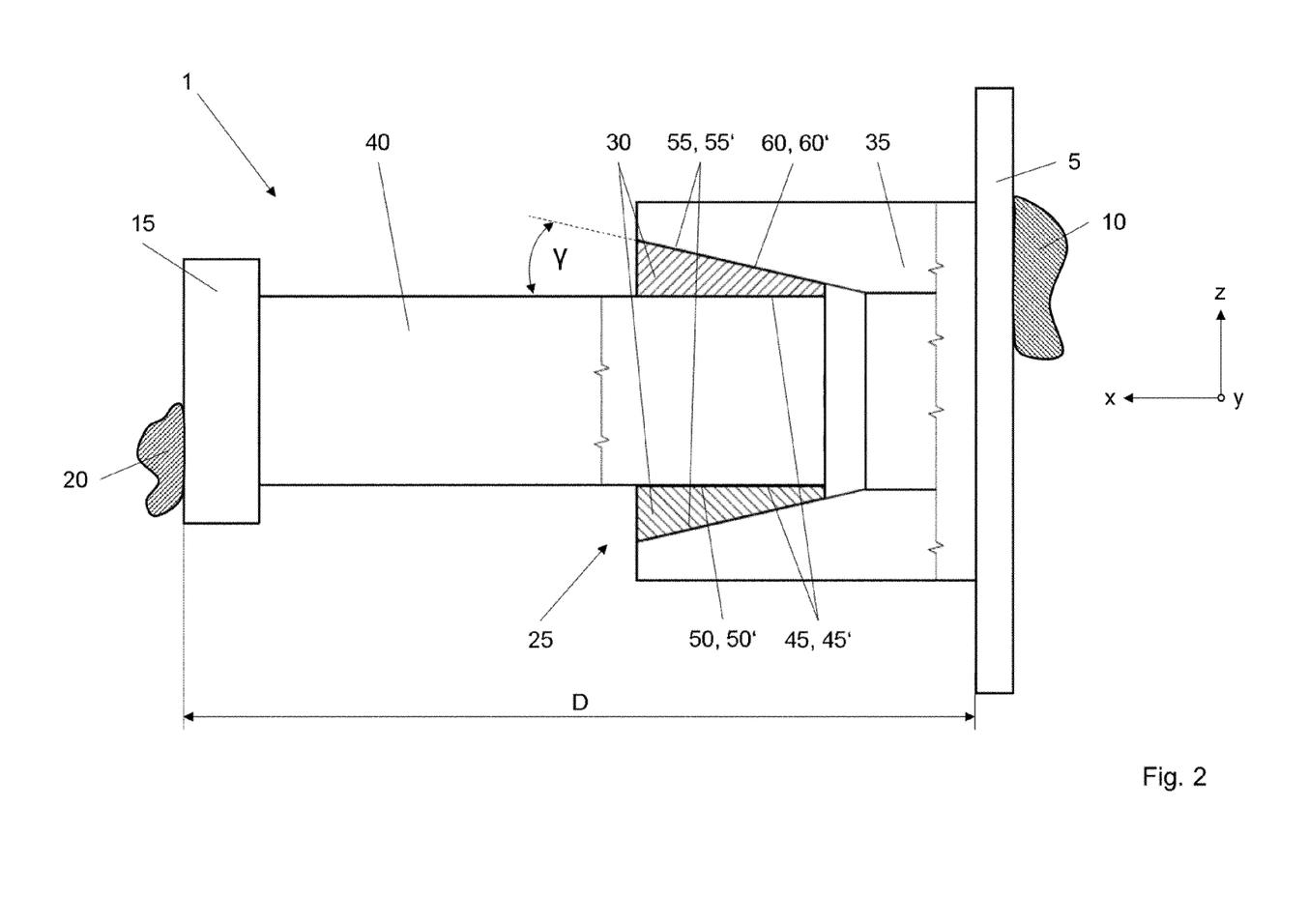
FIG. 2 is a side view of the deformation element shown in FIG. 1 in section.

The deformation element 1 illustrated in FIG. 1 is shown once more in FIG. 2 in a side view in section. For reasons of the perspective chosen here, only two friction elements 30 are illustrated. Each friction element 30 has a circular inner cross section whose inner surface 45 bears against the outer surface 50 of the plunger 40. The inner surface 45 and the outer surface 50 form a first friction pairing in which the inner surface 45 functions as a third friction surface 45' within the context of the above-described disclosure and the outer surface 50 functions as a second friction surface 50'.

Moreover, each friction element 30 has a circular outer cross section whose outer surface 55 bears against the inner surface 60 of the sleeve 35. As viewed in the longitudinal direction of the friction element 25, the sleeve 35 and the friction elements 30 are of conical design, wherein the corresponding cone, starting from the bumper plate 15 in the direction of the crossmember holder 5, that is to say in the expected direction of movement of the plunger 40 in the case of a frontal impact, tapers corresponding to a wedge angle γ known per se. The outer surfaces 55 of the friction elements 30 and the corresponding inner surface 60 of the housing 35 form a second friction pairing in which the outer surfaces 55, within the context of the above-described disclosure, function as a first friction surface 55' and the inner surface 60 functions as a fourth friction surface 60'.

The coefficients of static friction and coefficients of sliding friction which exist in the first friction pairing or the second friction pairing can be selected in a load case-dependent manner, in particular by a suitable selection of materials and their surface treatment and also by selection of the wedge angle γ, in the region of the inner surface 45 of the friction elements 30 in contact with the outer surface 50 of the plunger 40 or of the outer surface 55 of a friction element 55 with the inner surface 60 of the housing 35, that is to say then of the first friction surface 55', the second friction surface 50', the third friction surface 45' and the fourth friction surface 60'.

Figure 3:
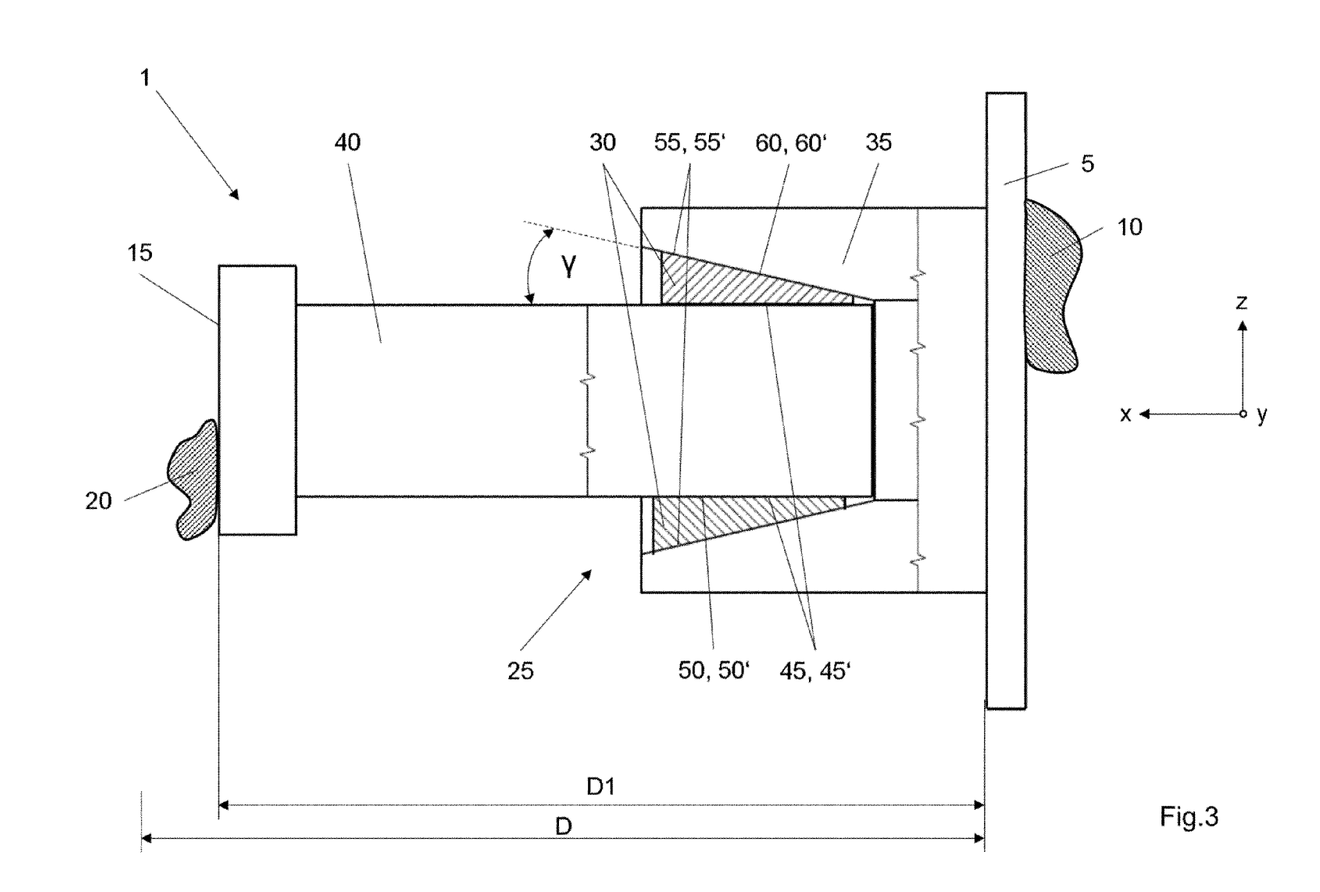
FIG. 3 is a side view of the exemplary deformation element according to the invention in a first position assumed during a low-speed crash.

Starting from the normal position of the deformation element 1 according to the invention as shown in FIG. 1, said element assumes the first position shown in FIG. 3 in the case of a low-speed crash. During a low-speed crash, comparatively large loads of up to 100 kN act at comparatively low speeds of from 4 km/h up to about 20 km/h. In such a case, the plunger 40 plunges into the sleeve 35 on account of the selected, load case-dependent first friction pairing and second friction pairing. Optionally, there can be provision that the friction elements 30 also move in the direction of the crossmember holder 5. The distance D1 between the bumper plate 15 and crossmember holder 5 that is established here is thus smaller than the distance D in the normal position.

Figure 4:
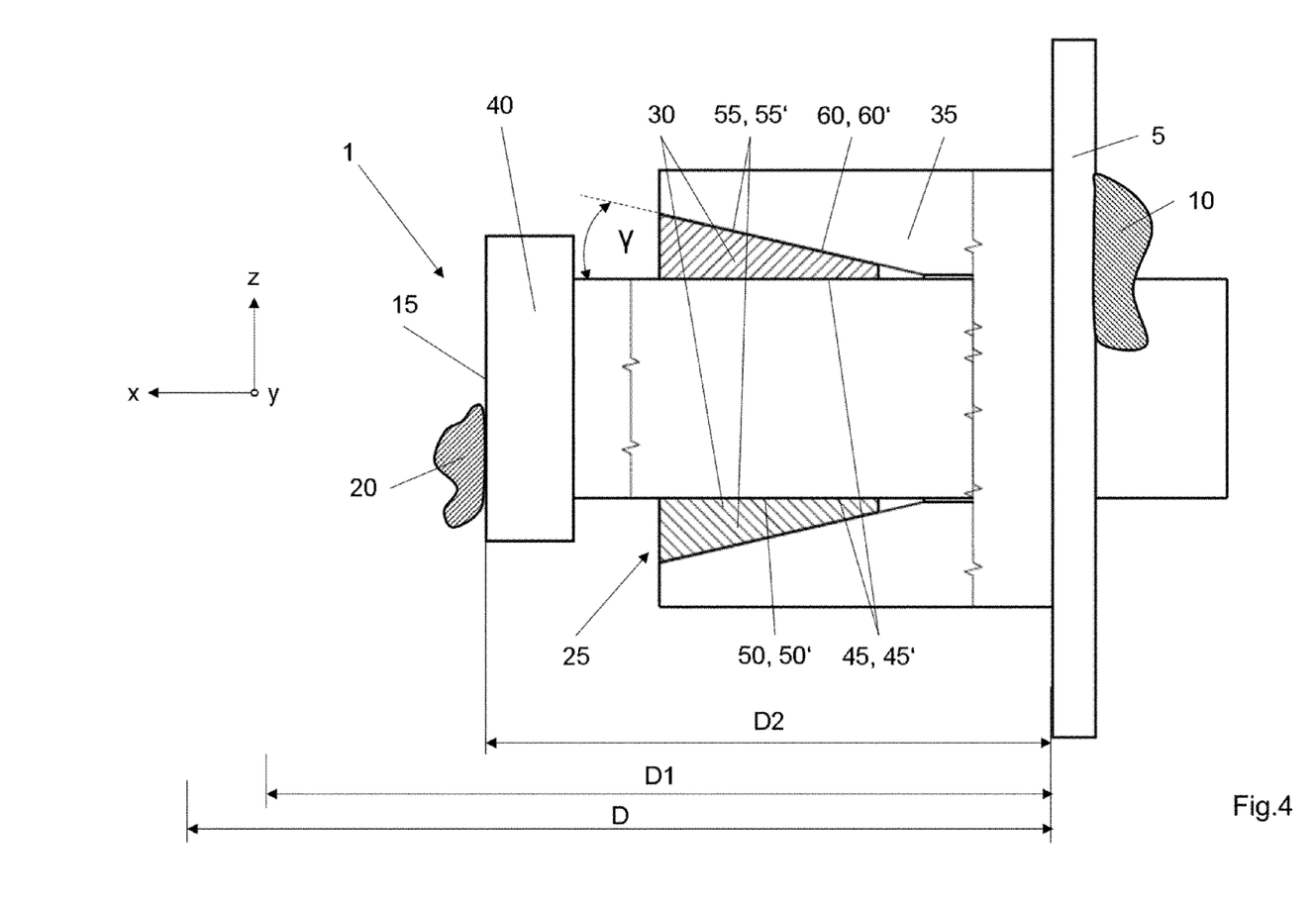
FIG. 4 is a side view of the exemplary deformation element according to the invention in a second position assumed in the case of a pedestrian protection function.

FIG. 4 is a side view of the deformation element 1 in a second position which it assumes in the case of a pedestrian protection function. For the purpose of the pedestrian protection function, the deformation element 1 is intended to take up the impact energy at relatively high speeds of about 20 km/h to 40 km/h, but at a comparatively low load level up to about 5 kN. On account of the friction values of the first friction pairing and of the second friction pairing which are inherent in the deformation element 1 a, the plunger plunges further into the sleeve 35 than during a low-speed crash. There can even be provision that—as shown here—the plunger 40 pierces through the crossmember holder 5 or penetrates through an opening, which is not shown here. This process allows a maximum reduction of the distance D to a distance D2 of the bumper plate 15 from the crossmember holder 5 in the second position representing a low-speed crash. As can be gathered from FIG. 4, the distance D2 is less than the distance D1, which in turn is less than the distance D and greater than the distance D2.

Figure 5:
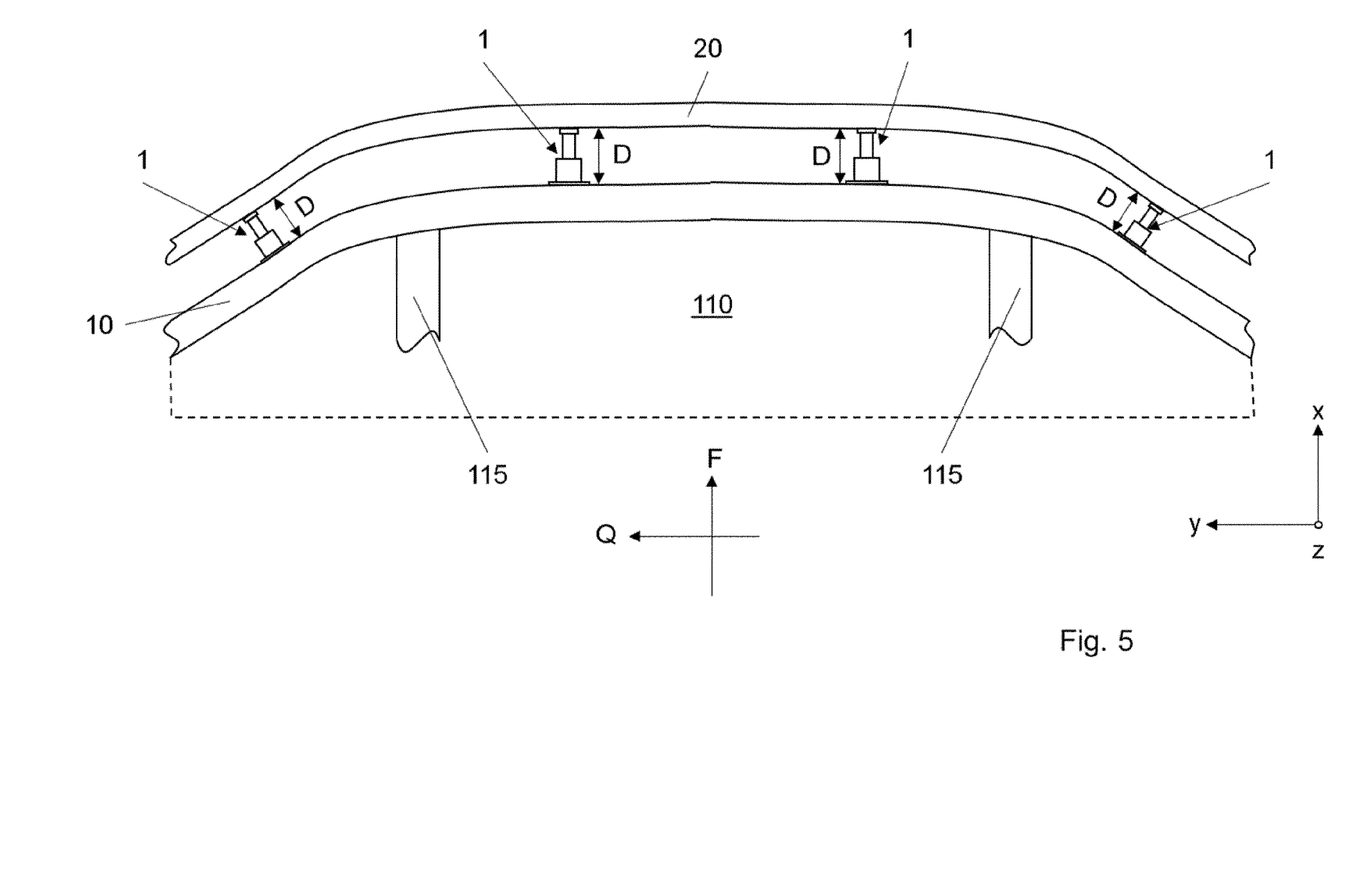
FIG. 5 is a partial view from above of a motor vehicle according to the invention having a number of mounted deformation elements of the type shown in FIG. 1.

FIG. 5 is a schematic plan view showing the front region of a motor vehicle 110 according to the invention, on which the crossmember 10 is fastened by way of supports 115. Corresponding to the normal position shown here, the bumper 20 is the element which protrudes the furthest in the main direction of travel F of the motor vehicle 110. In the exemplary embodiment shown here, four deformation elements 1 are distributed in the transverse direction Q over the length of the crossmember 10. The respective characteristics of the deformation elements 1, in particular their respective distances D, D1 and D2 relative to one another, and the conditions under which these distances D, D1 and D2 are achieved, are set in a position-dependent and load case-dependent manner for each individual deformation element 1. For this purpose, it can be provided for example that each individual deformation element 1 and/or a group thereof have or has different first friction pairings and/or second friction pairings. Depending on the accident situation, the distances D of the individual deformation elements are reduced as desired in a different or identical manner.

LIST OF REFERENCE SIGNS

1 Deformation element
5 Crossmember holder
10 Crossmember
15 Bumper plate
20 Bumper
22 Openings
25 Friction device
30 Friction element
35 Sleeve
40 Plunger
45 Inner surface of a friction element
45' Third friction surface
50 Outer surface of the plunger
50' Second friction surface
55 Outer surface of a friction element
55' First friction surface
60 Inner surface of the housing
60' Fourth friction surface
110 Motor vehicle
115 Support
D, D1, D2 Distances
F Main direction of travel
Q Vehicle transverse direction
γ Wedge angle
x, y, z Cartesian vehicle-oriented coordinate system The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A deformation element, comprising:
a crossmember holder that mounts on a crossmember of a motor vehicle;
a bumper plate positionable adjacent to a bumper of the motor vehicle; and
a friction device arranged between the bumper plate and the crossmember holder, wherein
the friction device adjusts and fixes a distance from the crossmember holder to the bumper plate using a friction body disposed at least partially between a plunger connected to the bumper plate and a housing connected to the crossmember holder, and
a first distance from the bumper plate to the crossmember holder, which first distance corresponds to a normal position of the deformation element, is greater in a first position than a distance in a second position.

2. The deformation element as claimed in claim 1, wherein
a first friction surface of the friction device between the crossmember holder and bumper plate and a second friction surface between the crossmember holder and bumper plate are formed so that the first friction surface allows adjustment and fixing of the bumper plate in the first position and blocks the bumper plate in the second position, whereas the second friction surface allows adjustment and fixing of the bumper plate in the second position and blocks the bumper plate in the first position.

3. The deformation element as claimed in claim 2, wherein
the friction device comprises the friction body on whose outer surface is at least partially arranged the first friction surface interacting with the crossmember holder and on whose inner surface is at least partially situated the second friction surface interacting with the bumper plate.

4. The deformation element as claimed in claim 3, when the friction body is formed as a wedge.

5. The deformation element as claimed in claim 3, wherein
the bumper plate is located on the plunger whose outer surface has a third friction surface that interacts with the second friction surface.

6. The deformation element as claimed in claim 5, wherein
the crossmember holder is mounted on a sleeve, the sleeve having on an inner side a fourth friction surface that interacts with the first friction surface.

7. The deformation element as claimed in claim 3, wherein
the crossmember holder is mounted on a sleeve, the sleeve having on an inner side a fourth friction surface that interacts with the first friction surface.

8. A motor vehicle, comprising:
a crossmember;
a bumper;
at least one deformation element, the deformation element comprising:
a crossmember holder that mounts on the crossmember of a motor vehicle;
a bumper plate positionable adjacent to the bumper of the motor vehicle;
a friction device arranged between the bumper plate and the crossmember holder, wherein
the friction device adjusts and fixes a distance from the crossmember holder to the bumper plate using a friction body disposed at least partially between a plunger connected to the bumper plate and a housing connected to the crossmember holder, and
a first distance from the bumper plate to the crossmember holder, which first distance corresponds to a normal position of the deformation element, is greater in a first position than a distance in a second position.

9. The motor vehicle according to claim 8, wherein
a first friction surface of the friction device between the crossmember holder and bumper plate and a second friction surface between the crossmember holder and bumper plate are formed so that the first friction surface allows adjustment and fixing of the bumper plate in the first position and blocks the bumper plate in the second position, whereas the second friction surface allows adjustment and fixing of the bumper plate in the second position and blocks the bumper plate in the first position.

10. The motor vehicle according to claim 9, wherein
the friction device comprises the friction body on whose outer surface is at least partially arranged the first friction surface interacting with the crossmember holder and on whose inner surface is at least partially situated the second friction surface interacting with the bumper plate.

11. The motor vehicle as claimed in claim 8, wherein
a plurality of deformation elements are arranged in a vehicle transverse direction, and
the friction devices of the plurality of deformation elements have coefficients of friction that are not all identical.

12. The motor vehicle as claimed in claim 11, wherein
the friction devices of the plurality of deformation elements have coefficients of friction different from one another.

\* \* \* \* \*